(12) United States Patent
Takahashi et al.

(10) Patent No.: US 7,168,303 B2
(45) Date of Patent: Jan. 30, 2007

(54) DIAGNOSTIC APPARATUS FOR EVAPORATIVE EMISSION CONTROL SYSTEM

(75) Inventors: Daisuke Takahashi, Tokyo (JP); Masaaki Aihara, Tokyo (JP); Yasushi Nakoji, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/085,272

(22) Filed: Mar. 22, 2005
(Under 37 CFR 1.47)

(65) Prior Publication Data

US 2005/0241377 A1   Nov. 3, 2005

(30) Foreign Application Priority Data

Mar. 26, 2004   (JP) ............................. 2004-093477

(51) Int. Cl.
*G01M 15/00* (2006.01)
(52) U.S. Cl. .................................................. 73/118.1
(58) Field of Classification Search .................. 73/116, 73/117.2, 117.3, 118.1, 49.7, 46, 47
See application file for complete search history.

(56) References Cited

U.S. PATENT DOCUMENTS

| | | | |
|---|---|---|---|
| 6,289,880 B1 | 9/2001 | Yamaguchi et al. | |
| 6,807,847 B2 * | 10/2004 | Steckler et al. | 73/49.7 |
| 2003/0154770 A1 * | 8/2003 | Steckler et al. | 73/49.7 |
| 2005/0055144 A1 * | 3/2005 | Steckler et al. | 701/31 |

FOREIGN PATENT DOCUMENTS

JP   2001-041116   2/2001

OTHER PUBLICATIONS

Copy of copending U.S. Appl. No. 10/926,296, filed Aug. 26, 2004 entitled "Diagnostic Device of Evaporated Fuel Processing System and the Method Thereof", and claiming JP 2003-304924.
Copy of copending U.S. Appl. No. 10/926,295, filed Aug. 26, 2004 entitled "Diagnostic Device of Evaporated Fuel Processing System and the Method Thereof", and claiming JP 2003-304914.
Copy of copending U.S. Appl. No. 11/200,094, filed Aug. 10, 2005, entitled "Diagnostic Apparatus for Evaporative Emission Control System", and claiming 2004-234648 priority.

* cited by examiner

*Primary Examiner*—Eric S. McCall
(74) *Attorney, Agent, or Firm*—Smith, Gambrell & Russell, LLP

(57) ABSTRACT

The present invention provides a diagnostic apparatus for an evaporative emission control system which can accurately execute leak diagnosis under a stable condition. An ECU clocks a time $t_{d2}$ until the internal pressure value $P_{te}$ of the evaporative emission control system sealed at the negative pressure reaches the target internal pressure value $P_d$, sets the pressure change measuring time $t_{e2}$ based on the clocking time $t_{d2}$, and measures the pressure change amount $P_1$ which varies after the internal pressure value $P_{te}$ of the evaporative emission control system reaches the target internal pressure value $P_d$ for a pressure change measuring time $t_{e2}$. Then, the ECU sets the determination value $P_{th0}$ based at least on the spatial capacity of the evaporative emission control system, and determines whether the evaporative emission control system is normal or abnormal based on the pressure change amount $P_1$.

16 Claims, 10 Drawing Sheets

DIAGNOSTIC APPARATUS FOR EVAPORATIVE EMISSION CONTROL SYSTEM

This application claims benefit of Japanese Application No. 2004-93477 filed on Mar. 26, 2004, the contents of which are incorporated by this reference.

BACKGROUND OF THE INVENTION

1. Field of the Invention

The present invention relates to a diagnostic apparatus for an evaporative emission control system and, more specifically, to a leak diagnosis of an evaporative emission control system including a fuel tank.

2. Description of the Related Art

Known is an internal combustion engine including an evaporative emission control system for preventing evaporated fuel in a fuel tank to be discharged in the atmosphere. In this system, evaporated fuel (evaporation gas) generated in the fuel tank is temporarily adsorbed by an adsorbent filled in a canister, and the adsorbed evaporated fuel is discharged to an intake system in an internal combustion engine via a purge passage (or line) under predetermined operating conditions. However, when a part of the system is broken or disrupted for some reasons, the evaporated fuel is discharged to the atmosphere. In order to prevent such a matter (or inconveniency), performed is leak diagnosis for determining presence of a leak in the evaporative emission control system. (for example, see JP-A-2001-41116)

In this leak diagnosis, a purge control valve (purge control solenoid valve) is fully closed first, and then a canister closing valve (drain valve) is fully closed, whereby a closed purge passage sealed from the atmospheric pressure is formed, and measured is a first pressure change amount $P_1$ due to a generation of the fuel evaporation gas under a positive atmospheric pressure. Then, the purge control valve is opened, and hence a negative pressure in the intake pipe is introduced into the fuel tank. When the purge control valve is closed again, formed is the closed purge passage sealed by a predetermined negative pressure, whereby measured is a second pressure change amount $P_2$ due to the generation of the fuel evaporation gas under the negative pressure. Then, a pressure leak presence is determined on the basis of the relation between the measured pressure change amounts $P_1$ and $P_2$ from the evaporative emission control system.

However, in the technology disclosed in the aforementioned JP-A-2001-41116, since the pressure change amounts $P_1$, $P_2$ are measured by sealing the evaporative emission control system in different pressure states respectively, it may be difficult to perform accurate leak diagnosis.

In other words, when the evaporative emission control system is sealed in different pressure states, a generated evaporation gas amount varies significantly even when such conditions as the amount of remaining fuel or the temperature are the same. Therefore, when the pressure change amounts $P_1$, $P_2$ are independently measured under such unstable conditions, it is difficult to determine the accurate leak.

SUMMARY OF THE INVENTION

In view of such circumstances, it is an object of the present invention to provide a diagnostic apparatus for an evaporative emission (gas) control system which can perform accurate leak diagnosis under stable conditions.

A diagnostic apparatus for an evaporative emission control system of the present invention includes negative pressure sealing control means for sealing an internal pressure of the evaporative emission control system including a fuel tank in an internal combustion engine at a preset negative pressure; measurement time setting means for measuring a time period until the internal pressure reaches a target internal pressure value and for setting a pressure change measurement time based on the measured time, pressure change amount measuring means for measuring the pressure change amount which corresponds to a changing amount of the internal pressure in the evaporative emission control system sealed at a negative pressure which changes for the pressure change measurement time after having reached the target internal pressure value; and diagnostic means for setting a determination value (at least) based on a spatial capacity in the evaporative emission control system for determining the evaporative emission control system to be normal when the pressure change amount is larger than the determination value and for determining the evaporative emission control system to be abnormal when the pressure change amount is smaller than the determination value.

DETAILED DESCRIPTION OF PREFERRED EMBODIMENTS

Figure 1:
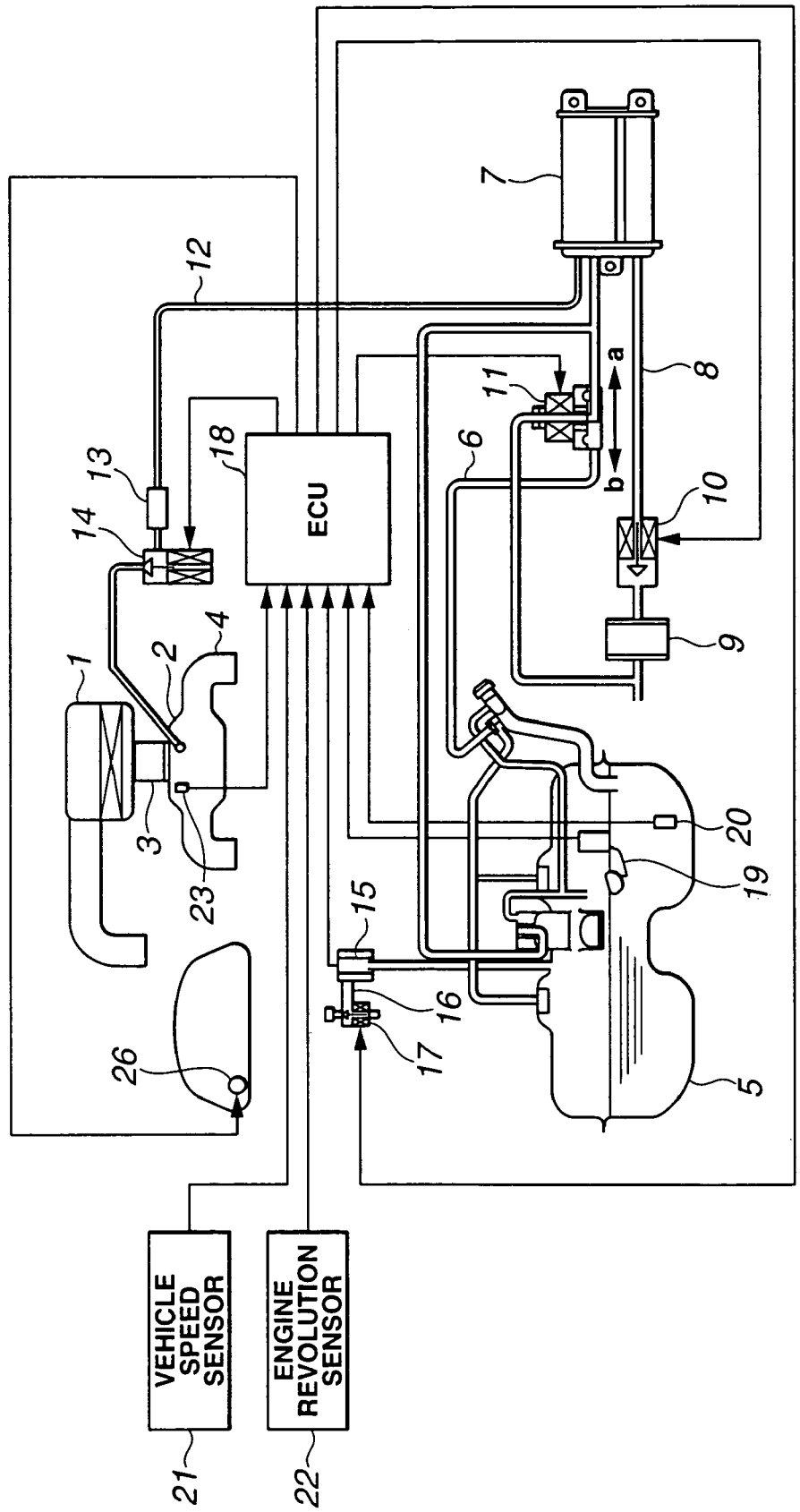
FIG. 1 is a schematic block diagram of an evaporative emission control system according to a first embodiment of the present invention.
Figure 2:
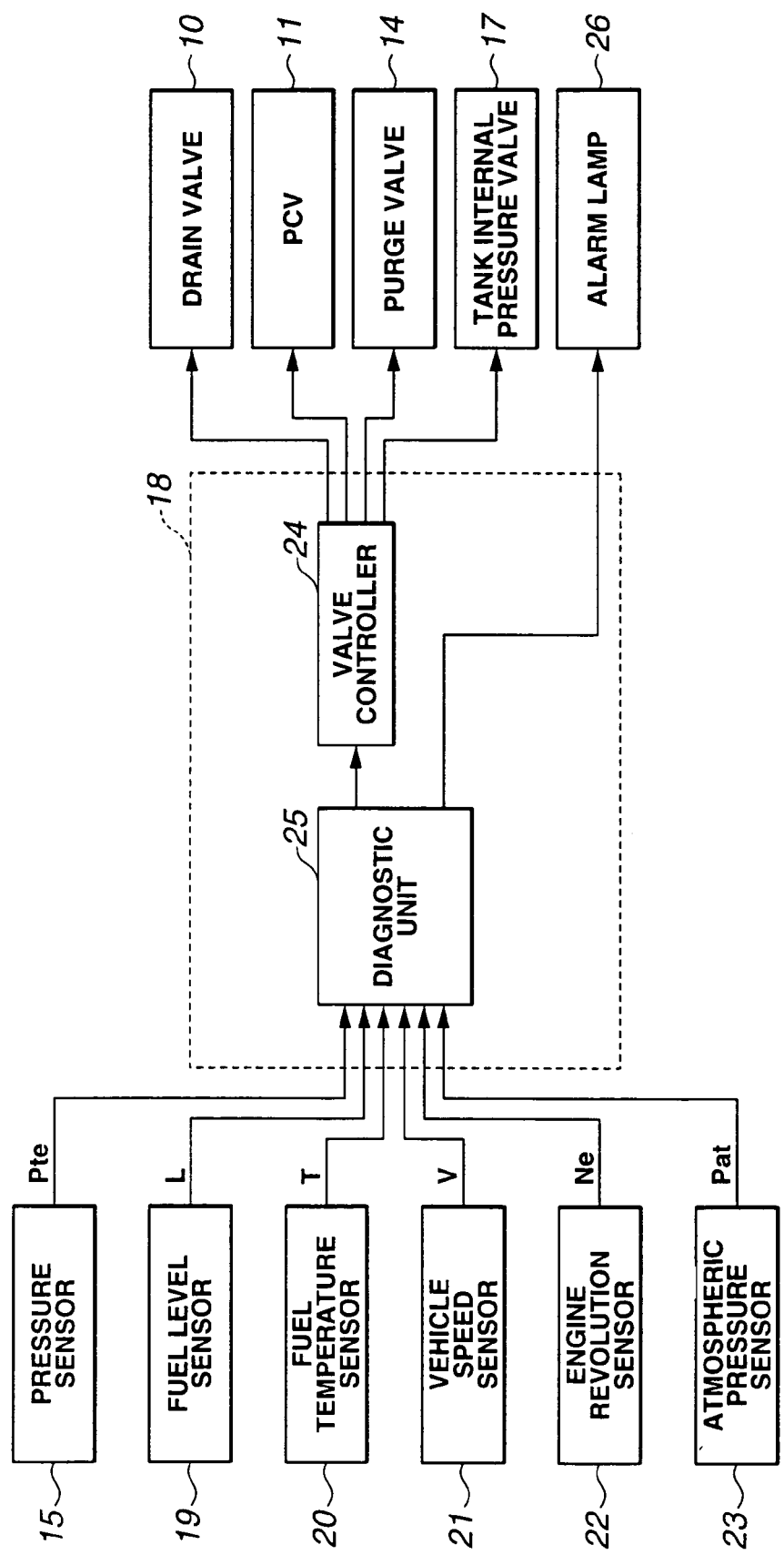
FIG. 2 is a functional block diagram of ECU according to the first embodiment.
Figure 3:
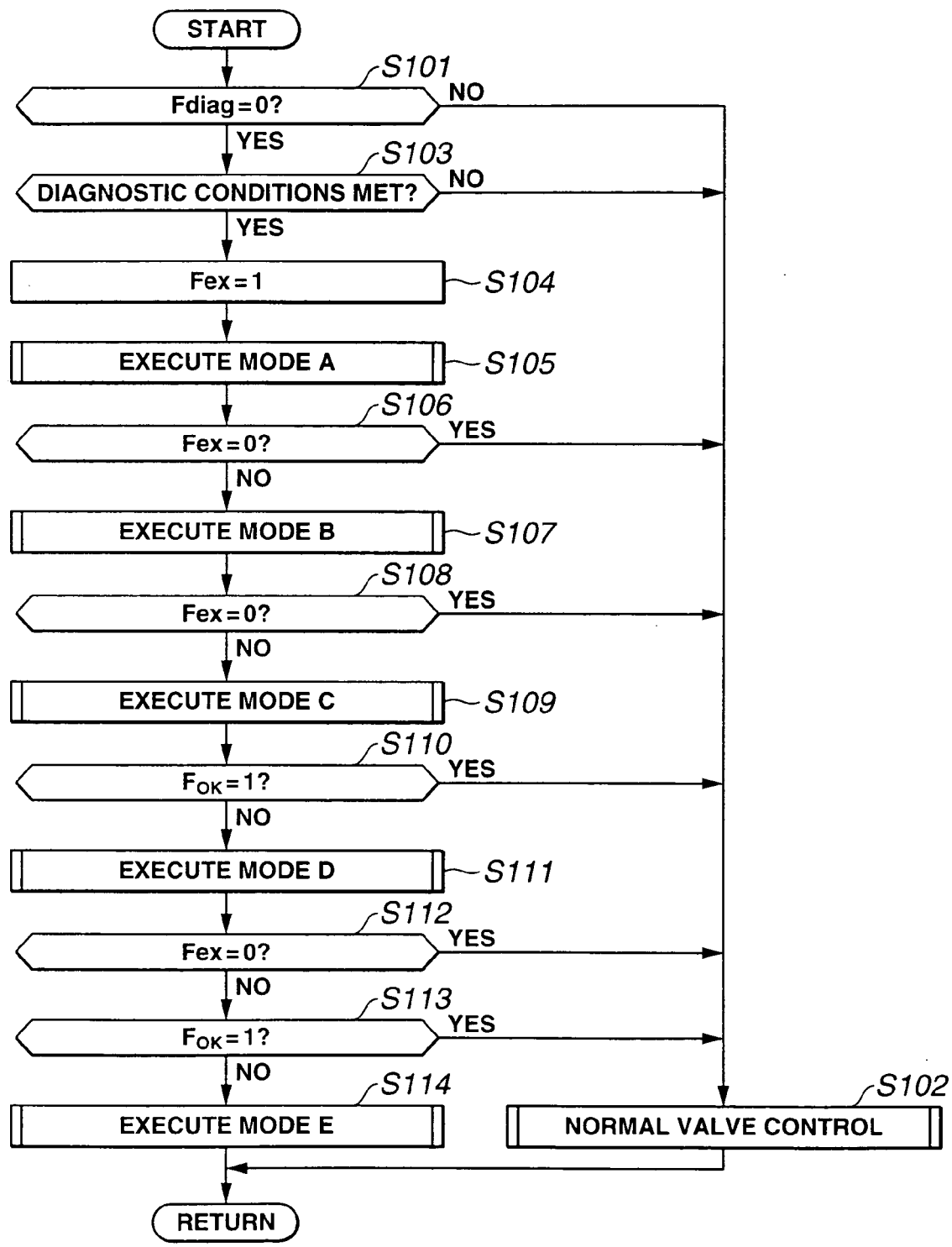
FIG. 3 is a flowchart of a main routine of a leak diagnosis according to the first embodiment.
Figure 4:
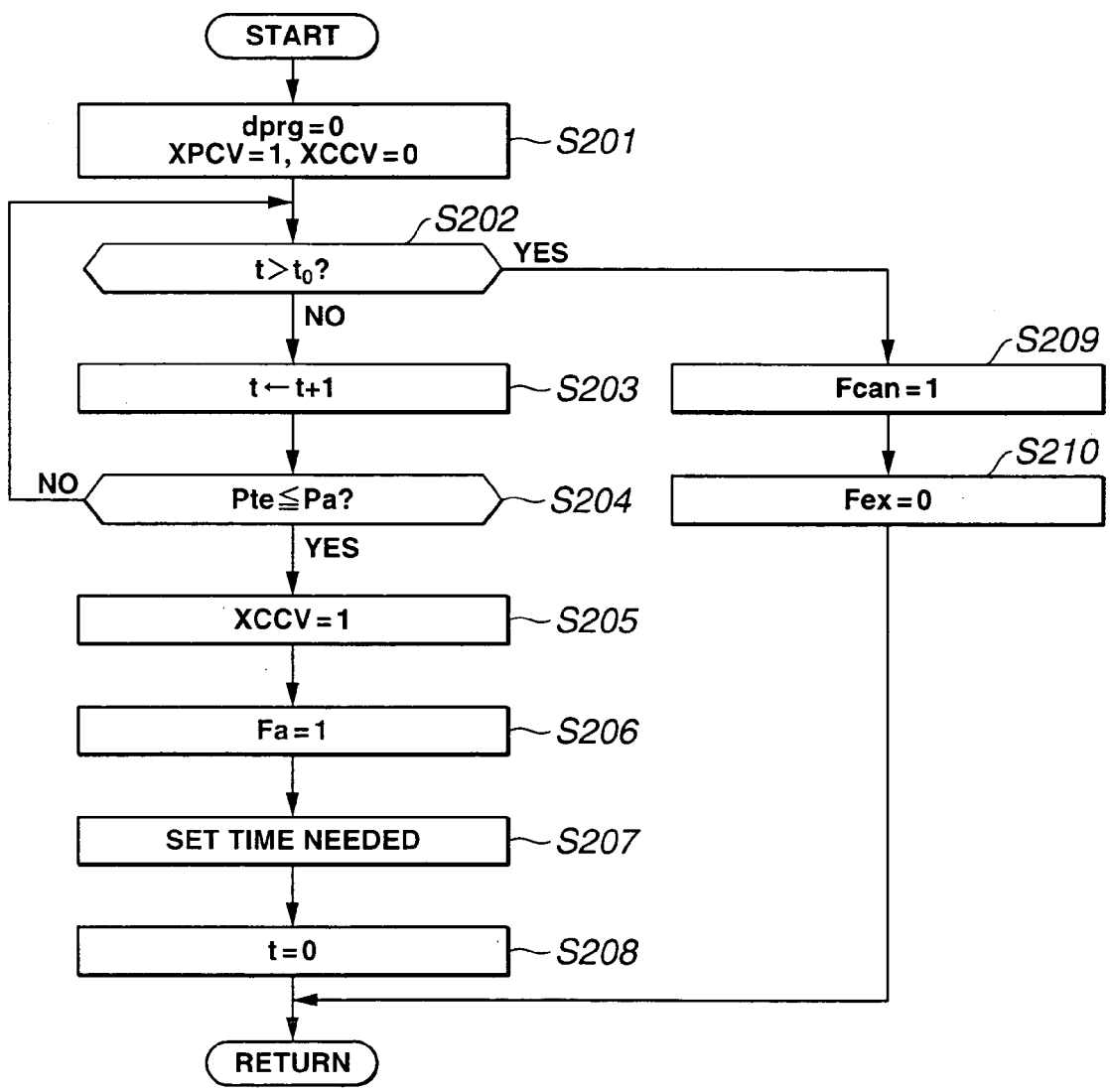
FIG. 4 is the flowchart of Mode A running subroutine in FIG. 3 according to the first embodiment.
Figure 5:
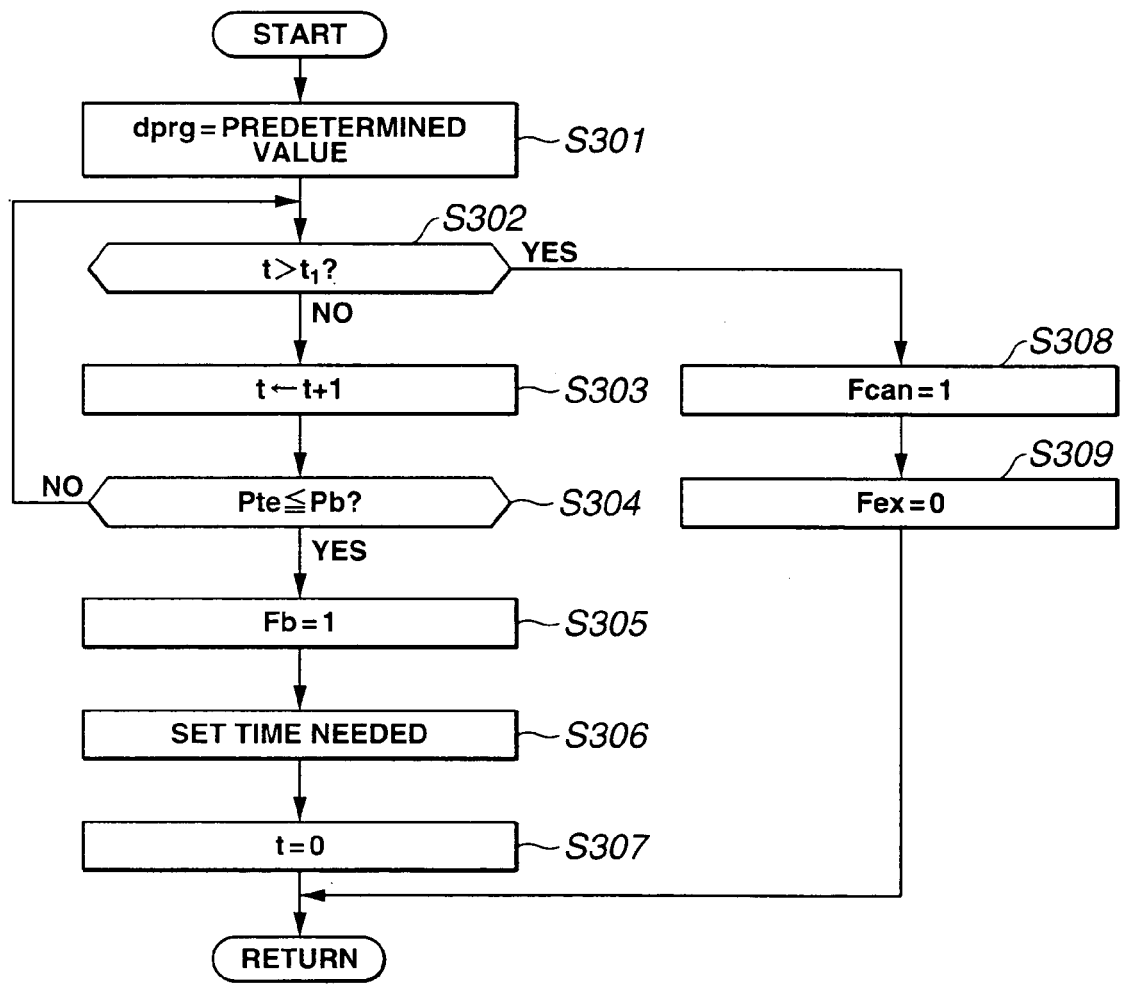
FIG. 5 is the flowchart of Mode B running subroutine in FIG. 3 according to the first embodiment.
Figure 6:
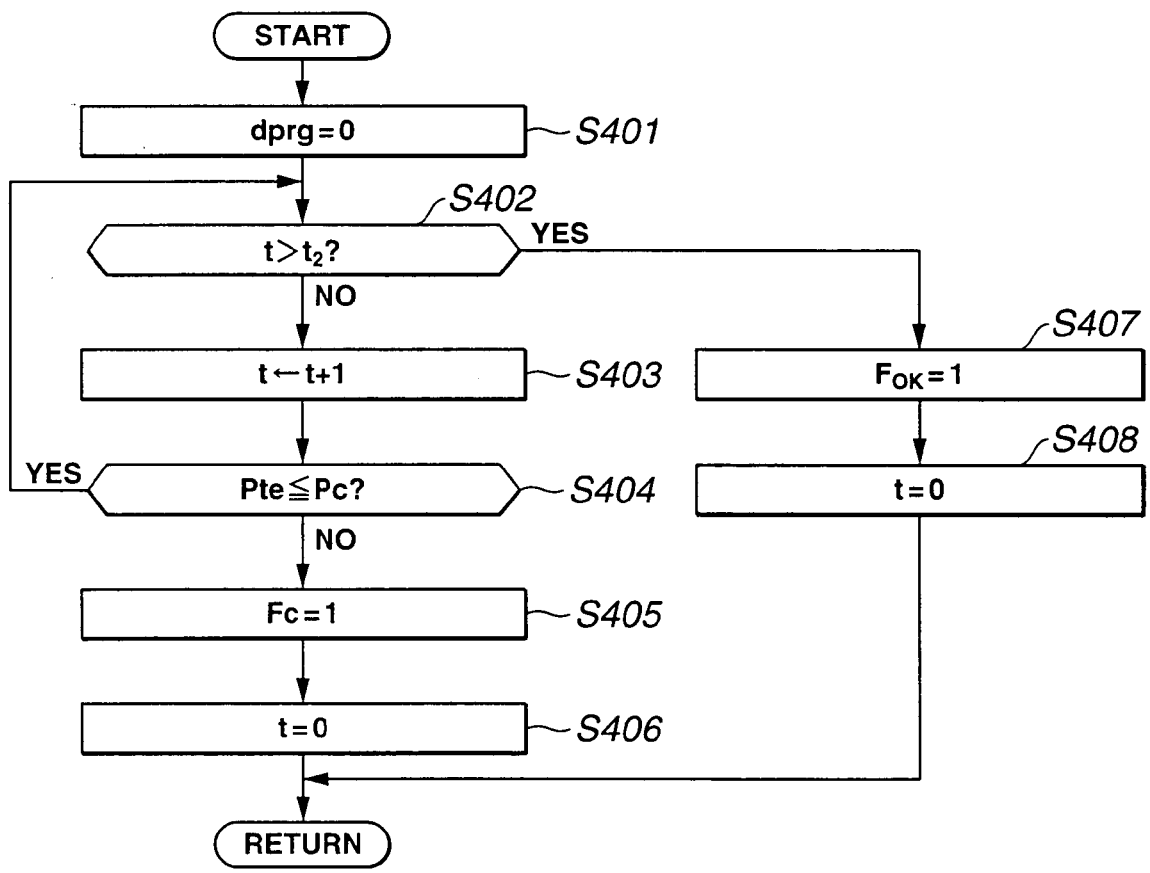
FIG. 6 is the flowchart of Mode C running subroutine in FIG. 3 according to the first embodiment.
Figure 7:
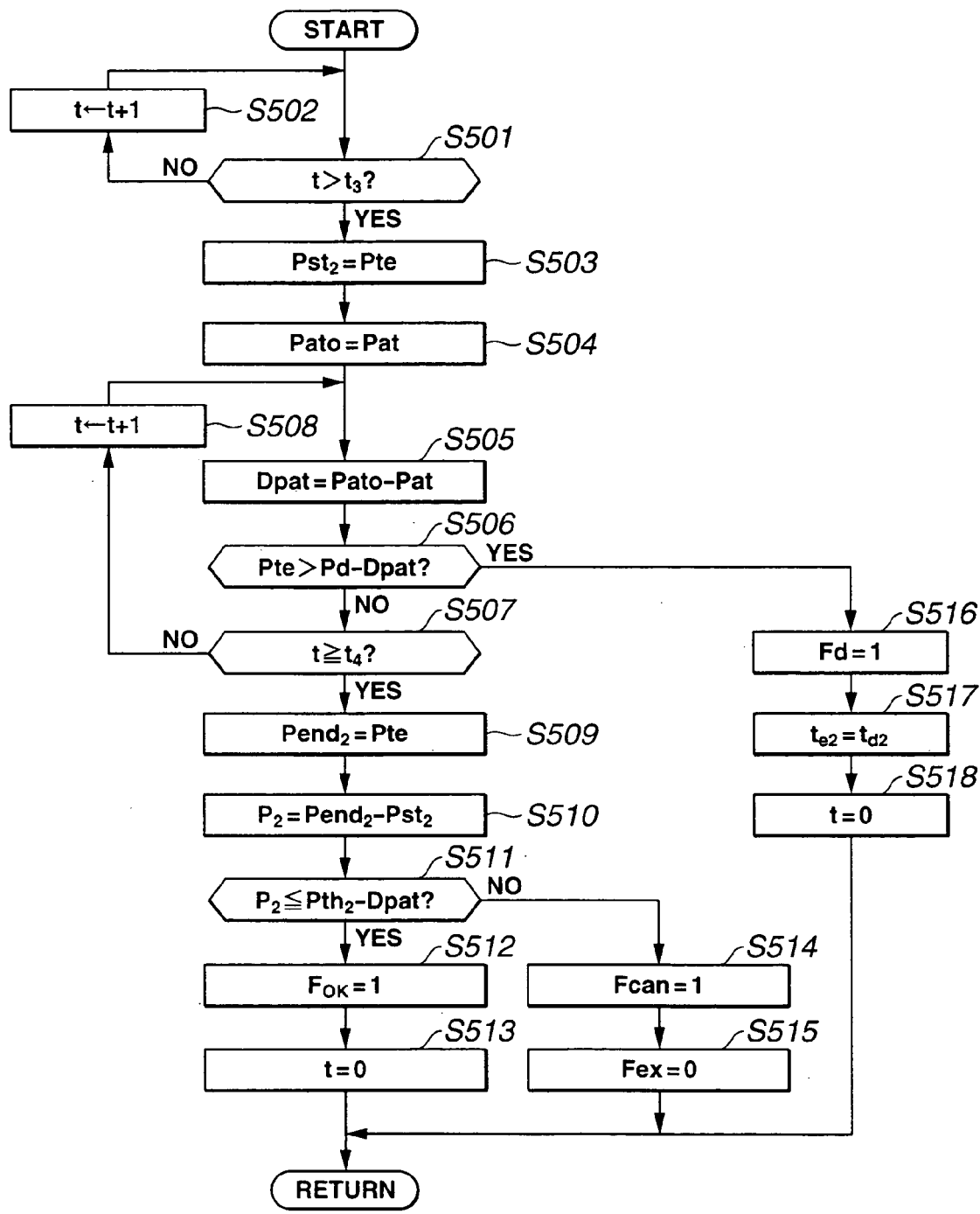
FIG. 7 is the flowchart of Mode D running subroutine in FIG. 3 according to the first embodiment.
Figure 8:
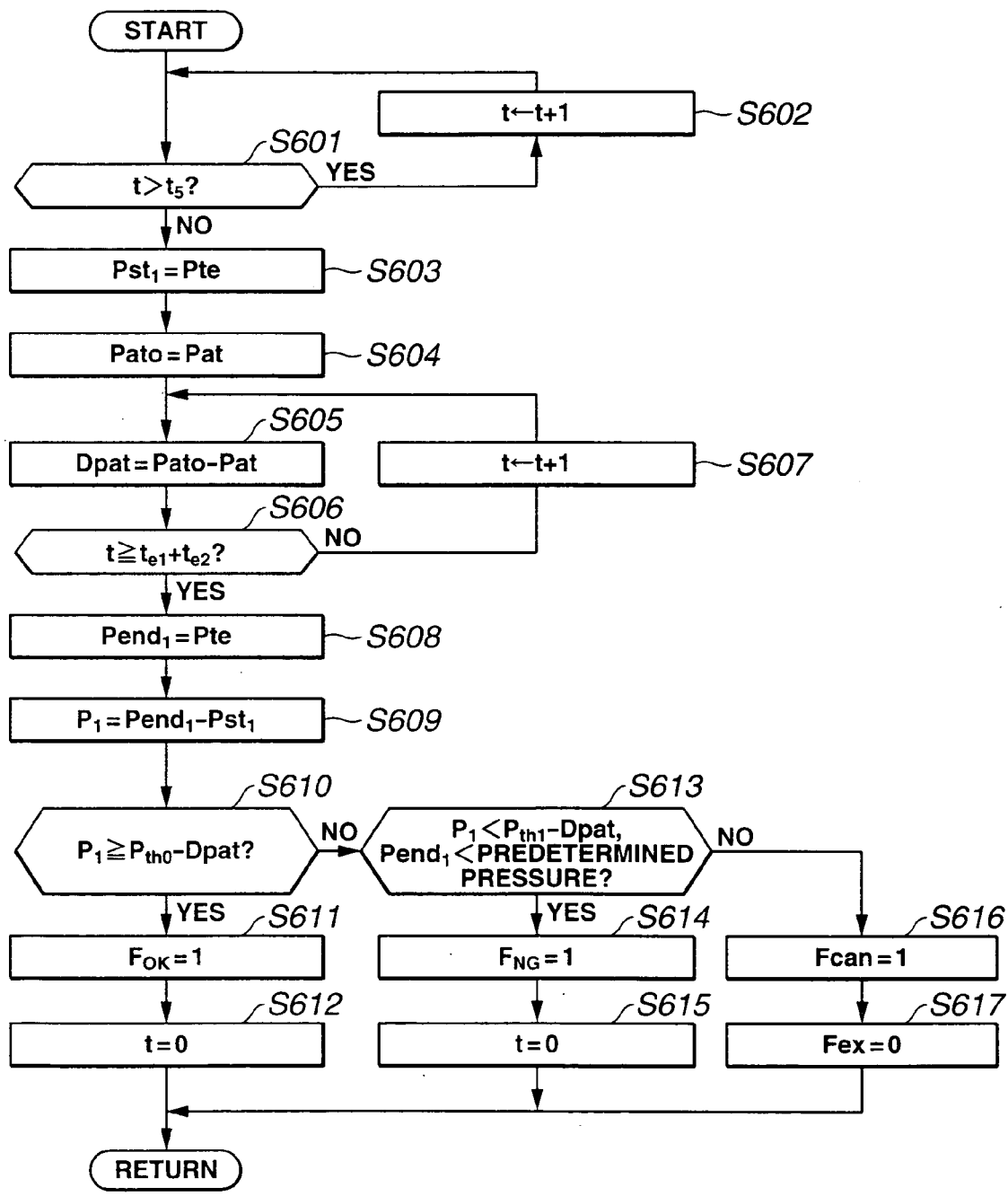
FIG. 8 is the flowchart of Mode E running subroutine in FIG. 3 according to the first embodiment.
Figure 9:
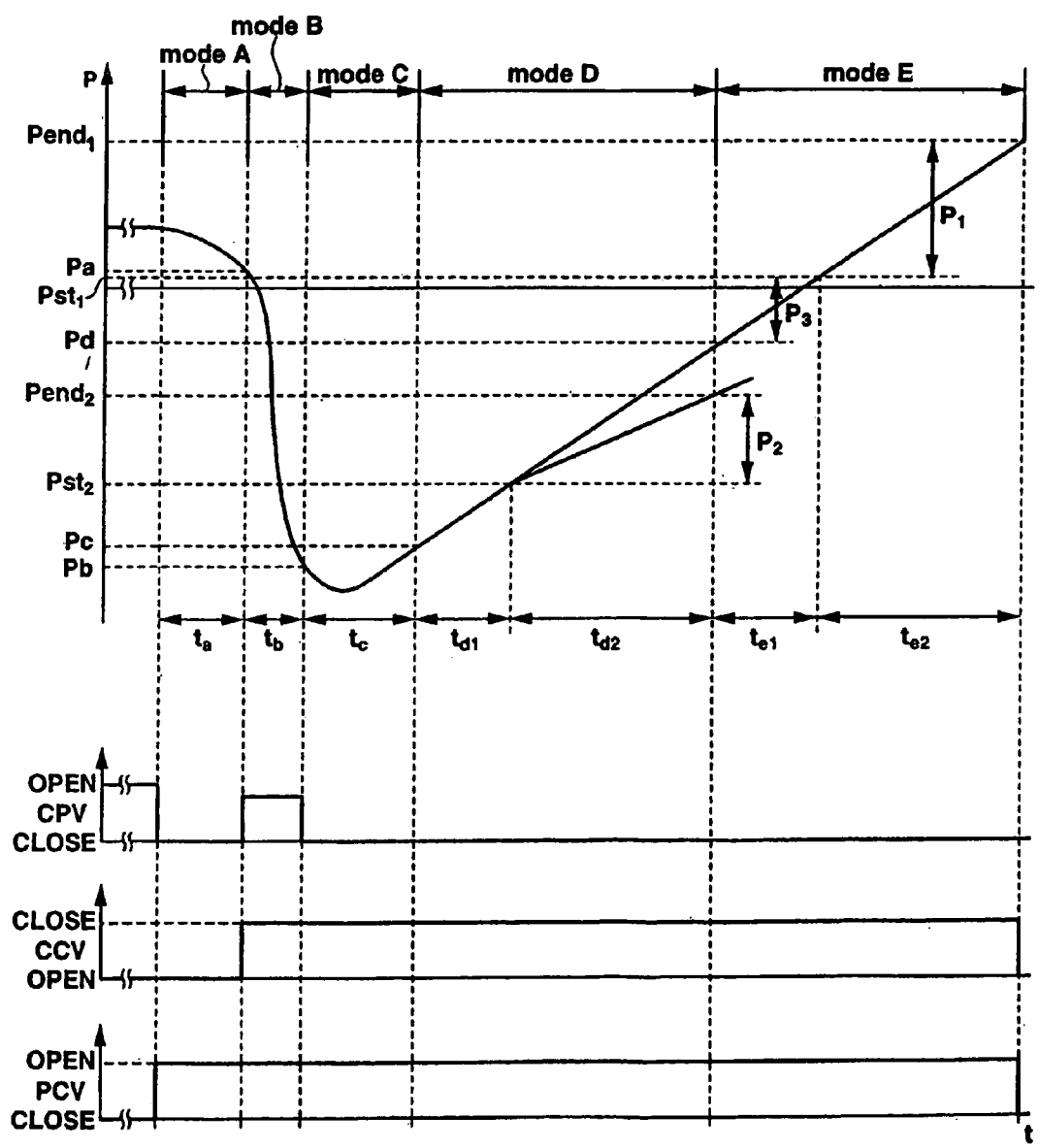
FIG. 9 is a timing chart of the leak diagnosis according to the first embodiment.

Embodiments of the present invention will be described by referring now to drawings. The drawings are relating to the first embodiment of the invention, in which FIG. 1 is a schematic block diagram of an evaporative emission control system; FIG. 2 is a functional block diagram of an ECU; FIG. 3 is a flowchart of a main routine of the leak diagnosis; FIG. 4 is the flowchart of Mode A running subroutine in FIG. 3; FIG. 5 is the flowchart of Mode B running subroutine in FIG. 3; FIG. 6 is the flowchart of Mode C running subroutine in FIG. 3; FIG. 7 is the flowchart of Mode D running subroutine in FIG. 3; FIG. 8 is the flowchart of Mode E running subroutine; FIG. 9 is a timing chart of leak diagnosis.

In FIG. 1, air from which dust or the like in the atmosphere is removed by an air cleaner 1 is controlled in its flow rate according to an opening degree of an electric throttle valve, not shown. The throttle valve is provided in a throttle body 3 mounted in an intake passage between the air cleaner 1 and an air chamber 2, and the opening degree (throttle opening degree) is set by an electric motor. The opening degree is set by an output signal from a control unit 18 (hereinafter, referred to as ECU) configured mainly from a microcomputer. An induced air controlled in its flow rate by the opening degree flows through the air chamber 2 and an intake manifold 4, and is mixed with a fuel (gasoline) injected from a fuel injector, not shown. The fuel injector is arranged so that a distal end thereof projects into the intake manifold 4 and is provided for each cylinder of an engine. Each fuel injector receives a pressure-adjusted fuel via a fuel line (not shown) in communication with a fuel tank 5. Air-fuel mixture formed in the intake manifold 4 flows into a combustion chamber of the engine by opening an intake valve. Then, the air-fuel mixture is ignited by an ignition plug, and burned, so that a driving force of the engine is generated. An exhaust gas after a combustion is discharged from the combustion chamber to the exhaust passage by opening an exhaust valve.

The evaporated fuel generated in the fuel tank 5 is discharged into the air chamber 2 of the intake system via the evaporative emission control system. More specifically, the fuel tank 5 is in communication with a canister 7 via an evaporative gas passage 6 provided above the fuel tank 5. The evaporated fuel in the fuel tank 5 is adsorbed by such an absorbent as an active charcoal or the like filled in the canister 7. The gas which does not contain fuel contents (in particular hydrocarbon (HC) or the like) passes through a fresh air introducing passage 8, is purified by a drain filter 9, and is discharged into the atmosphere. The fresh air introducing passage 8 is provided with a drain valve 10 (hereinafter referred to as "CCV") opened and closed by the ECU 18. Under a normal operational control of the valve, the CCV 10 is set in a state in which an electromagnetic solenoid is OFF and hence in an opened state (OPEN state). On the other hand, during the leak diagnosis, the electromagnetic solenoid is turned ON, and the CCV 10 is set to a closed state (CLOSE state).

The evaporative gas passage 6 is provided with a pressure control solenoid valve 11 (hereinafter referred to as "PCV") having a mechanical pressure adjusting mechanism for adjusting the internal pressure of the fuel tank 5. The PCV 11 opens and closes depending on the pressure difference between the internal pressure of the fuel tank 5 and the atmospheric pressure, or the pressure difference between the internal pressure of the fuel tank 5 and the internal pressure of the canister 7 in a normal state in which the integrated electromagnetic solenoid is turned OFF. More specifically, when the internal pressure in the fuel tank 5 increases to a value higher than the atmospheric pressure, the PCV 11 opens and the evaporated fuel in the fuel tank 5 flows toward the canister 7 (b to a of the evaporative gas passage 6 in the drawing). Accordingly, the state of the pressure in the fuel tank 5 is adjusted to the atmospheric pressure, and an increase of an internal pressure of the fuel tank 5 is restrained. When the internal pressure is decreased to the value lower than the internal pressure of the canister 7, that is, when the pressure in the fuel tank becomes a negative pressure, the PCV 11 opens, and the gas in the canister 7 flows toward the fuel tank 5 (a to b of the evaporative gas passage 6 in the drawing). Accordingly, the state of the pressure in the fuel tank 5 is adjusted to the atmospheric pressure, and the pressure drops in the fuel tank 5 is restrained. With such mechanical pressure adjusting mechanism of the PCV 11, deformation or breakage of the fuel tank 5 can be prevented effectively. On the other hand, during the leak diagnosis, the electromagnetic solenoid is turned ON according to the control signal from the ECU 18 and the PCV 11 is forcedly opened. In this OPEN state, the gas flows either from the fuel tank 5 to the canister 7, or from the canister 7 to the fuel tank 5 depending on the pressure difference between the internal pressures of the fuel tank 5 and the canister 7 (from a to b, or b to a of the evaporative gas passage 6 in the drawing).

On the other hand, a purge passage 12 extending between the canister 7 and the air chamber 2 of the intake system is formed with a chamber 13 and is provided with a purge control solenoid valve 14 (hereinafter referred to as "purge valve" or "CPV") in a downstream thereof. The purge valve 14 is a duty solenoid valve in which the opening is set depending on the duty ratio of the control signals outputted from the ECU 18, and during the leak diagnosis, the opening is adjusted depending on the state of diagnosis. On the other hand, under normal control conditions, the opening of the purge valve 14 is controlled depending on the operating state, and accordingly, the purging amount is adjusted. The chamber 13, provided upstream of the purge valve 14, is provided for reducing a flow noise or a pulsating noise generated by opening and closing operations of the purge valve 14.

A pressure sensor 15 for detecting the internal pressure (internal pressure value) of the fuel tank 5 is mounted on an upper side of the fuel tank 5. The pressure sensor 15 is a sensor for detecting the pressure difference between the atmospheric pressure and the internal pressure of the fuel tank 5, which is outputted to the ECU 18 as an internal pressure value $P_{te}$. In an atmospheric air introducing passage 16 for introducing an atmospheric air into the pressure sensor 15 is provided with a solenoid valve 17 (hereinafter referred to as "tank internal pressure valve") for switching the internal pressure of the tank to be opened and closed by the ECU 18. The reason for providing the valve 17 is to cope with the fact that if the atmospheric pressure varies in accordance with variations in height during running, even when an absolute pressure value in the fuel tank 5 is constant, the internal pressure value $P_{te}$ varies. Under normal conditions, the integrated electromagnetic solenoid is turned OFF and the tank internal pressure valve 17 is set to the OPEN state, whereby the atmospheric air introducing passage 16 is opened toward the atmosphere. On the other hand, during the leak diagnosis, the electromagnetic solenoid is turned ON according to the control signal from the ECU 18, and the tank internal pressure valve 17 is set to the CLOSE state. Accordingly, the state of the pressure in the atmospheric air introducing passage 16 between the pressure sensor 15 and the tank internal pressure valve 17 can be adjusted to the atmospheric pressure.

The ECU 18 executes a calculation relating to a fuel injection amount of the fuel injector, an injection timing, an ignition timing of the ignition plug, and the throttle opening degree according to a control program stored in the ROM. The ECU 18 outputs a controlled variable (control signal) calculated by the calculation to the various actuators. The ECU 18 executes the leak diagnosis on the evaporative emission control system including the fuel tank 5 of the above mentioned evaporative emission control system. Information required for the ECU 18 to execute the leak diagnosis includes detection signals from the pressure sensor 15 and various sensors 19–23. A fuel level sensor 19 is provided in the fuel tank 5 for detecting a remaining level L of a stored fuel. A fuel temperature sensor 20 is for detecting a fuel temperature T, a vehicle speed sensor 21 is for detecting a vehicle speed v, and an engine revolution sensor 22 is for detecting an engine revolution Ne. An atmospheric pressure sensor 23 detects the atmospheric pressure, and outputs the same to the ECU 18 as an atmospheric pressure value $P_{at}$.

As shown in FIG. 2, if reviewing the respective portions for executing the leak diagnosis, the ECU 18 includes a valve control unit 24 and a diagnostic unit 25. The valve control unit 24 outputs control signals for instructing OPEN and CLOSE states of the respective valves 10, 11, 17 depending on the state of the leak diagnosis at the diagnostic unit 25. The electromagnetic solenoid is turned ON and OFF by these signals, and the OPEN and CLOSE states of the corresponding valve 10, 11, 17 are set. The valve control unit 24 controls the purge valve 14 to an opening according to the duty ratio of the control signal by outputting the control signal to the purge valve 14. Then, the valve control unit 24 seals the evaporative emission control system at predetermined negative pressure during diagnosis. In other words, the ECU 18 realizes a function as a negative pressure sealing control unit by the valve control unit 24.

The diagnostic unit 25 measures a duration $t_{d2}$ which is required for the internal pressure value $P_{te}$ of the evaporative emission control system sealed at the a negative pressure to reach the target internal pressure value $P_d$, and sets the pressure change measurement time $t_{e2}$ based on the duration $t_{d2}$ and measures the pressure change amount $P_1$ which is changed after the internal pressure value $P_{te}$ of the evaporative emission control system has reached the target internal pressure value $P_d$ for the pressure change measurement time $t_{e2}$. Then, the diagnostic unit 25 sets a determination value $P_{th0}$ based at least on the spatial capacity of the evaporative emission control system, and when the pressure change amount $P_1$ is larger than the determination value $P_{th0}$, the evaporative emission control system is determined to be normal, while the evaporative emission control system is determined to be abnormal when the pressure change amount $P_1$ is smaller than the determination value $P_{th0}$. In this case, the diagnostic unit 25 executes a predetermined delay control during the period from the timing when the internal pressure value $P_{te}$ of the evaporative emission control system have reached the target internal pressure value $P_d$ until the timing when measurement of the pressure change amounts $P_1$ is started. In other words, the ECU 18 realizes the respective functions as measurement time setting means, pressure change amount measuring means, diagnostic means, and delay control means.

Subsequently, the leak diagnosis according to the present embodiment will be described in detail based on a flowchart of a main routine of the leak diagnosis shown in FIG. 3. This routine is called up every predetermined intervals (10 ms for example) during a period from the time the engine starts until it stops (that is, one operation cycle), and is executed by the ECU 18. The object of the leak diagnosis in the present embodiment is the evaporative emission control system including the fuel tank 5 (the evaporative gas passage 6, the canister 7, the purge passage 12 communicating the purge valve 14 and the canister 7).

When this routine starts, the ECU 18 first checks whether or not a diagnosis execution flag $F_{diag}$ is "0". The diagnosis execution flag $F_{diag}$ is initially set to "0", and when the leak diagnosis has completed adequately, that is, when the diagnostic result such as "normal" or "abnormal" is obtained in one operating cycle, it is set to "1". Therefore, when the diagnosis execution flag $F_{diag}$ is once changed from "0" to "1" at a certain timing, thereafter, the ECU 18 follows the determination in Step S101 and proceeds to Step S102 as long as the operation cycle continues. In this case, the ECU 18 leaves this routine after having executed the normal control of the valves.

Here, in Step S102, the ECU 18 sets the control value XCCV for the CCV 10 to "0" and hence turns OFF the electromagnetic solenoid, so that the CCV 10 is opened. The ECU 18 also sets the control value XPCV for the PCV 11 to "0" and hence turns OFF the electromagnetic solenoid, so that the PCV 11 is opened and closed by a mechanical structure. Also, by setting the control value dprg for the CPV 14 to a predetermined duty ratio according to the operating conditions and duty-controlling the electromagnetic solenoid, the CPV 14 is opened and closed by a predetermined opening as required. Subsequently, the control value for the tank internal pressure valve 17 is set to "0" and hence the electromagnetic solenoid is turned OFF, so that the tank internal pressure valve 17 is opened.

On the other hand, when the diagnosis execution flag $F_{diag}$ is determined to be "0" in Step S101, that is, when the leak diagnosis is not completed, the ECU 18 proceeds to Step S103, and checks whether or not the diagnosis execution conditions are currently met is checked.

The diagnosis execution conditions are the conditions specifying the operating conditions suitable for executing the leak diagnosis, and include, for example, the following (1) to (4) conditions.

(1) More than a predetermined period (for example, 325 sec) is elapsed after having started the engine.

Immediately after having started the engine, an RPM (the number of engine revolution) Ne is not stable and the internal pressure value $P_{te}$ becomes unstable, whereby a possibility of erroneous determinations in the leak diagnosis may arise. Therefore, when the time elapsed after the engine has started is short, it is determined that the RPM Ne is not stable, and a permission of leak diagnosis executions is not given.

(2) A fuel temperature T is within a predetermined range (for example, $-10 \leq T \leq 35°$ C.).

When the fuel temperature T is high, the amount of a generated evaporating fuel increases, and hence a leak presence in the evaporative emission control system including the fuel tank 5 can hardly be determined. Therefore, the fuel temperature T is detected by the fuel temperature sensor 20 and, if the fuel temperature T does not fall within the range preset adequately, a permission to execute the leak diagnosis is not given.

(3) The vibration of fuel in the fuel tank is small.

In the state which the fuel in the fuel tank 5 vibrates significantly, the pressure in the fuel tank 5 varies significantly. Therefore, the possibility of the erroneous determination in the leak diagnosis arises. Therefore, fuel vibrations in the fuel tank 5 are determined by using a fuel level sensor 19. The fuel vibration can be estimated from the amount of a level change $\Delta L$ of the remaining amount level L detected by the fuel level sensor 19 for a unit time. In other words, when the amount of the level change $\Delta L$ is larger than the adequately set determination value, it is determined that the fuel vibrations are significant and hence the permission to execute the leak diagnosis is not given.

(4) The number of engine revolution (RPM) Ne and the vehicle speed v are larger than the predetermined values (for example, Ne$\geq$1500 rpm, v$\geq$70 km/h).

Since the running state is unstable at a low speed, there arises the possibility of the erroneous determination in the leak diagnosis. Therefore, the leak diagnosis is performed during the high speed running in which the running condition is relatively stable.

Then, in Step S103, when at least any one of conditions from (1) to (4) is not met, the ECU 18 proceeds to Step S102 to execute the normal control for the valves, and leaves the routine.

On the other hand, in the Step S103, when all the conditions from (1) to (4) are met, the ECU 18 proceeds to Step S104 to set an executing condition "MET" flag $F_{ex}$, which indicates that the conditions for executing the diagnosis are met, to "1", and then proceeds to Step S105. At this time, the ECU 18 sets the control value for the tank internal pressure valve 17 to "1", and turns the electromagnetic solenoid ON to close the tank internal pressure valve 17.

When the ECU 18 has proceeded from Step S104 to S105, the ECU 18 executes the leak diagnosis by following the processes from Mode A to Mode E in sequence until it reaches Step S114.

In other words, when the ECU 18 has proceeded from Step S104 to Step S105, the ECU 18 calls up Mode A execution subroutine shown in FIG. 4, and executes the process of Mode A according to the subroutine (see mode A in FIG. 9). This subroutine is for stabilizing the state of the pressure (executing the stabilizing process) by causing the internal pressure value $P_{te}$ of the evaporative emission control system to drop to the value close to the atmospheric pressure. When this subroutine starts, the ECU 18 sets the control value dprg for the CPV 14 to "0" first, and then turns the electromagnetic solenoid OFF to close the CPV 14 in Step S201. The ECU 18 also sets the control value XPCV for the PCV 11 to "1" and turns the electromagnetic solenoid ON, so that the PCV 11 is opened compulsorily. The ECU 18 sets the control value XCCV for the CCV 10 to "0" and turn off the electromagnetic solenoid, so that the CCV 10 is opened. With these procedures, the evaporative emission control system is opened to the atmosphere through the CCV 10.

In the following Step S202, the ECU 18 checks whether or not a count value $t$ reaches the preset value $t_0$. Here, in Mode A, the count value represents the elapsed time from the start of Mode A. The preset value $t_0$ represents the time which is variably set according to the level L of the remaining fuel amount, and is set to a time period sufficient to cause the internal pressure value $P_{te}$ of the evaporative emission control system to drop to a value close to the atmospheric pressure by opening to the atmosphere through the CCV 10 when a generated amount of the evaporated fuel is less than the predetermined value (that is, when the amount of generation of the evaporated fuel is less than the predetermined value with which the leak diagnosis can be executed adequately). More specifically, the preset value $t_0$ is set according to a table of the fuel remaining amount and, when the level L of the remaining amount is low and the spatial capacity of the evaporative emission control system is large, it is set to a large value, and when the level L of the remaining amount is high and the spatial capacity of the evaporative emission control system is small, it is set to a small value.

Then, when the ECU 18 determines that the count value $t$ does not reach the preset value $t_0$ ($t \leq t_0$) in Step S202, the ECU 18 proceeds to Step S203, where the count value $t$ is incremented ($t \leftarrow t+1$), and then to Step S204.

When the process goes from Step S203 to S204, the ECU 18 checks whether or not the current internal pressure value $P_{te}$ does not exceed the target internal pressure value $P_a$. Here, in the present embodiment, the target internal pressure value $P_a$ is a fixed value set to the value close to the atmospheric pressure, and is set to the predetermined value (for example, +1.5 mmHg) based on the atmospheric pressure.

When it is determined that the internal pressure value $P_{te}$ is not dropped to the target internal pressure value $P_a$ in Step S204, the ECU 18 returns to Step S202, and when it is determined that the internal pressure value $P_{te}$ is within the target internal pressure value $P_a$, the ECU 18 proceeds to Step S205.

When the process goes from Step S204 to Step S205, the ECU 18 changes the control value XCCV for the CCV 10 from "0" to "1" and turns the electromagnetic solenoid ON, so that the CCV 10 is closed. After having closed the CCV 10, the ECU 18 proceeds to Step S206 to set a Mode A end flag $F_a$, which indicates that MODE A is ended, to "1", and then in the subsequent Step S207, sets a required time $t_a$ from the start of Mode A to the end based on the count value $t$ ($t_a = t$). Then, in the subsequent Step S208, the ECU 18 resets the count value $t$ to "0", and leaves the subroutine.

On the other hand, when it is determined that the count value $t$ reaches the preset value $t_0$ ($t > t_0$) in Step S202, that is, when the internal pressure value $P_{te}$ is not dropped to the target internal pressure value Pa even after the preset time (the preset time based on the preset value $t_0$) has elapsed from the start of Mode A, the ECU 18 determines that a generated amount of the evaporated fuel is currently excessive and it is difficult to execute the adequate leak diagnosis, thereby proceeding to Step S209.

When the process goes from the S202 to S209, the ECU 18 suspends the leak diagnosis and sets a cancel flag $F_{can}$ to "1", and in subsequent Step S210, resets the executing condition "MET" flag $F_{ex}$ to "0", and leaves the subroutine.

In the main routine, when the process goes from the Step S105 to Step S106, the ECU 18 checks whether or not the executing condition "MET" flag $F_{ex}$ is reset to "0" by the Mode A process described above.

Then, when it is determined that the executing condition "MET" flag $F_{ex}$ is "0" in Step S106, the ECU 18 proceeds to Step S102 to execute the normal control of the valve, and leaves the routine.

On the other hand, in Step S106, when it is determined that the executing condition "MET" flag $F_{ex}$ is maintained at "1", the ECU 18 proceeds to Step S107. When the process goes from Step S106 to Step S107, the ECU 18 calls Mode B subroutine shown in FIG. 5, and executes the Mode B process (see mode B in FIG. 9). This subroutine is for causing the internal pressure value $P_{te}$ of the evaporative emission control system to drop to the predetermined target internal pressure value $P_b$ by utilizing the negative pressure in the intake pipe of the intake manifold 4 and, when the subroutine starts, the ECU 18 sets the control value "dprg" for the CPV 14 to a predetermined duty ratio in Step S301, and controls the electromagnetic solenoid by a duty cycle, so that the CPV 14 is opened with a predetermined opening degree. Accordingly, started is inducing the negative pressure to the evaporative emission control system.

In the subsequent Step S302, the ECU 18 checks whether or not the count value $t$ reaches the preset value $t_1$. Here, in this Mode B, the count value $t$ represents the elapsed time from the start of Mode B. The preset value $t_1$ represents the time which is variably set according to the level L of the remaining amount of the fuel, and is set to the time period sufficient to cause the internal pressure value $P_{te}$ of the evaporative emission control system to drop to the value close to the target internal pressure value $P_b$ by introducing the negative pressure through the] CPV 14 when the generated amount of the evaporated fuel is less than the predetermined value (that is, when the amount of the evaporated fuel is less than the predetermined value with which the leak diagnosis can be executed adequately). More specifically, the preset value $t_1$ is, for example, adapted to be set according to the table of the fuel remaining amount preset in advance and, when the level L of the remaining amount is low and the spatial capacity of the evaporative emission control system is large, it is set to a large value, and when the level L is high and the spatial capacity is small, it is set to a small value.

Then, when the ECU 18 determines that the count value t does not reach the preset value $t_1$ (t≦$t_1$) in Step S302, the ECU 18 proceeds to Step S303, where the count value t is incremented (t←t+1), and then to Step S304.

When the procedure goes from Step S303 to Step S304, the ECU 18 checks whether or not the current internal pressure value $P_{te}$ does not exceed the target internal pressure value $P_b$. Here, in the present embodiment, the target internal pressure value $P_b$ is set, for example, to – (minus) 15 mmHg with reference to the atmospheric pressure.

Then, when it is determined that the internal pressure value $P_{te}$ is not dropped to the target internal pressure value $P_b$ in Step S304, the ECU 18 returns to Step S302, and when it is determined that the internal pressure value $P_{te}$ is within the target internal pressure value $P_b$, the ECU 18 proceeds to Step S305.

When the procedure goes from Step S304 to Step S305, the ECU 18 proceeds to Step S306 to set a Mode B "END" flag $F_b$, which indicates that MODE B is ended, to "1", and then in the subsequent Step S306, sets the time needed $t_b$ from the start of Mode B to the "END" based on the count value t ($t_b$=t). Then, in the subsequent Step S307, the ECU 18 resets the count value t to "0", and leaves the subroutine.

On the other hand, when it is determined that the count value t reaches the preset value $t_1$ (t>$t_1$) in Step S302, that is, when the internal pressure value $P_{te}$ is not dropped to the target internal pressure value $P_b$ even after the preset time (the preset time based on the preset value $t_1$) is elapsed from the start of Mode B, the ECU 18 determines that the generated amount of the evaporated fuel is currently excessive and it is difficult to execute the adequate leak diagnosis, thereby proceeding to Step S308.

When the process goes from the Step S302 to Step S308, the ECU 18 suspends the leak diagnosis and sets a cancel flag $F_{can}$ to "1", and in subsequent Step S309, resets the executing condition "MET" flag $F_{ex}$ to "0", and leaves the subroutine.

In the main routine, when the process goes from the Step S107 to Step S108, the ECU 18 checks whether or not the executing condition "MET" flag $F_{ex}$ is reset to "0" by the Mode B process described above.

Then, when it is determined that the executing condition "MET" flag $F_{ex}$ is "0" in Step S108, the ECU 18 proceeds to Step S102 to execute the normal control of the valves, and leaves the routine.

On the other hand, in Step S108, when it is determined that the executing condition "MET" flag $F_{ex}$ is maintained at "1", the ECU 18 proceeds to Step S109. When the process goes from Step S108 to Step S109, the ECU 18 calls Mode C subroutine shown in FIG. 6, and executes the Mode C process (see mode C in FIG. 9). This subroutine is for stabilizing the internal pressure of the evaporative emission control system which became unstable by introducing the negative pressure in Mode B. When the subroutine starts, the ECU 18 first sets the control value "dprg" with respect to the CPV 14 to "0" in Step S401, and turns the electromagnetic solenoid OFF, whereby the CPV 14 is closed. Accordingly, the evaporative emission control system is sealed at the negative pressure.

In the subsequent Step S402, the ECU checks whether or not the count value t reaches the preset value $t_2$. Here, in this Mode C, the count value t represents the time elapsed from the start of Mode C. The preset value $t_2$ represents the time which is variably set according to the level L of the remaining amount of the fuel, and is set to the time period sufficient to cause the internal pressure value $P_{te}$ to rise to the target internal pressure value $P_c$ (for example, the value higher than the target internal pressure value $P_b$ by approximately several mmHg) by only the leak when the leak sufficient to determine "abnormal" exists in the evaporative emission control system. More specifically, the preset value $t_2$ is, for example, set according to a preset table of the fuel remaining amount and, when the level L of the remaining amount is low and the spatial capacity is large, it is set to the large value, and when the level L is high and the spatial capacity is small, it is set to the small value.

When it is determined that the count value t does not reach the preset value $t_2$ in Step S402 (t≦$t_2$), the ECU 18 proceeds to Step S403, where the count value t is incremented (t←t+1), and then to Step S404.

When the process goes from Step S403 to Step S404, the ECU 18 checks whether or not the current internal pressure value $P_{te}$ does not exceed the target internal pressure value $P_c$.

When it is determined that the internal pressure value $P_{te}$ is not raised to the target internal pressure value $P_c$ yet, the process goes back to Step S402, and when it is determined that the internal pressure value $P_{te}$ exceeds the target internal pressure value $P_c$, the process goes to Step S405.

When the process goes from Step S404 to Step S405, the ECU 18 sets a Mode C "END" flag $F_c$, which indicates that Mode C is ended, to "1", and in the subsequent Step S406, the count value t is reset to "0", and leaves the subroutine.

On the other hand, when it is determined that the count value t reaches the value $t_2$ (t>$t_2$) in Step S402, that is, when the internal pressure value $P_{te}$ is not raised to the target internal pressure value $P_c$ even after the preset time (preset time based on the preset value $t_2$) has elapsed from the start of Mode C, the ECU 18 determines that sufficient leak to be determined as "abnormal" does not exist in the evaporative emission control system (that is, the evaporative emission control system is "normal"), and proceeds to Step S407. The case which is determined to be "normal" in Step S402 naturally includes the case where no leak exists in the evaporative emission control system, and the case in which the generated amount of the evaporated fuel is small.

Then, when the process goes from Step S402 to Step S407, the ECU 18 sets a NORMAL determination flag $F_{ok}$, which indicates that such result that the evaporative emission control system is in the "normal" state without a leak is obtained, to "1", and in the subsequent Step S408, resets the count value t to "0", and, leaves the subroutine. In other words, the ECU 18 determines that the evaporative emission control system to be "normal" without executing subsequent Mode D or Mode E process.

When the process goes to Step S109 to Step S110 in the main routine, the ECU 18 checks whether or not the "NORMAL" determination flag $F_{ok}$ is set to "1" by the Mode C process described above.

Then, when the "NORMAL" determination flag $F_{ok}$ is determined to be "1" in Step S110, the ECU 18 proceeds to Step S102 to perform the normal control of the valve, and leaves the routine. In this case, the ECU 18 sets the diagnosis execution flag $F_{diag}$ to "1".

On the other hand, when it is determined that the "NORMAL" determination flag $F_{ok}$ is not "1" in Step S110, the ECU 18 proceeds to the Step S111. When the process goes to Step S110 to Step S111, the ECU 18 calls the Mode D execution subroutine shown in FIG. 7, and executes the Mode D process according to the subroutine (See mode D in FIG. 9). This subroutine is for setting the pressure change measurement time $t_{e2}$ when measuring the pressure change amount $P_1$ of the evaporative emission control system in Mode E process described later based on the internal pressure rise time $t_{d2}$.

Here, in the present embodiment, the ECU 18 measures the time required for the internal pressure value $P_{te}$ to rise from an internal pressure value $P_{st}$ preset in Step S503 at a clock-starting time described later to a predetermined target internal pressure value $P_d$ as an internal pressure rise time $t_{d2}$. The target internal pressure value $P_d$ indicates, for example, the internal pressure value variably set according to the level L of the remaining, amount of the fuel, and the target internal pressure value $P_d$ is set on the basis of the table of the fuel remaining amount preset in advance. More specifically, the target internal pressure value $P_d$ is set to the small value when the level L of the remaining amount is low and the spatial capacity is large, and is set to the large value when the level L is high and the spatial capacity is small. The target internal pressure value $P_d$ may be set to the value corresponding to the level L and the fuel temperature T based on the preset map of the fuel remaining amount and the fuel temperature. In this case, the higher the fuel temperature T is, the larger the target internal pressure value $P_d$ is.

When the subroutine starts, the ECU 18 first checks whether or not the count value t reaches the preset value $t_3$ in Step S501. In Mode D, the count value t represents the elapsed time from the start of Mode D. The preset value $t_3$ represents a delay time for further ensuring the stabilization of the variations in the internal pressure which is stabilized in Mode C described above, and is set, for example, to a fixed value ($t_{d1}$ in FIG. 9) which is set in advance. In other words, when a large amount of the evaporated fuel is generated and hence Mode C is terminated in an early stage, there may be a case in which the internal pressure is not stabled at a moment when the internal pressure value $P_{te}$ reaches the target internal pressure value $P_c$. Therefore, the ECU 18 waits until the count value t reaches the preset value $t_3$. In other words, when it is determined that the count value t does not reach the preset value $t_3$ (t≦$t_3$), the ECU 18 proceeds to Step S502, where the count value t is incremented (t←t+1), and returns to Step S501.

On the other hand, when it is determined that the count value t reaches the preset value $t_3$ (t>$t_3$), the ECU 18 proceeds to Step S503 to set the current internal pressure value $P_{te}$ as a clocking-start internal pressure value $P_{st2}$ at the clock-starting time, and proceeds to Step S504.

Then, since the pressure sensor 15 is for measuring the relative pressure with respect to the atmospheric pressure in order to accurately measure the variations in the internal pressure value $P_{te}$ caused by the generation of the evaporated fuel for a long time, it is necessary to correct the variations in the atmospheric pressure. In other words, for example, when the vehicle is running on an up-hill, the atmospheric pressure varies in proportion to heights. Therefore, it is necessary to correct the variations of atmospheric pressures. Therefore, as the process goes from Step S503 to Step S504, the ECU 18 sets the atmospheric pressure $P_{at}$ measured when the clocking-start internal pressure value $P_{st2}$ has been set as an initial value $P_{at0}$. After that, when the procedure goes from Step S504 to Step S505, the ECU 18 calculates the difference ($P_{at0}-P_{at}$) between the initial value $P_{at0}$ and the current atmospheric pressure $P_{at}$ as the atmospheric pressure correction amount $D_{pat}$, and proceeds to Step S506.

When the process proceeds from Step S505 to Step S506, the ECU 18 checks whether or not the current internal pressure value $P_{te}$ reaches the target internal pressure value $P_d$ (more specifically, the target internal pressure value ($P_d-D_{pat}$) corrected by the corresponding atmospheric pressure).

Then, when it is determined that the internal pressure value $P_{te}$ does not reach the target internal pressure value ($P_{te} \leq P_d-D_{pat}$), the ECU 18 proceeds to Step S507, and checks whether or not the count value t reached the preset value $t_4$. The preset value $t_4$ is set to a sufficient time to cause the internal pressure value $P_{te}$ to rise to the target internal pressure value $P_d$ when more than the predetermined amount of the evaporated fuel is generated in the evaporative emission control system.

When it is determined that the count value t does not reach the preset value $t_4$ in Step S507, the ECU 18 proceeds to Step S508, where the count value t is incremented (t←t+1), and returns to Step S505.

On the other hand, when it is determined that the count value t reaches the preset value $t_4$, that is, when the internal pressure value $P_{te}$ does not reach the target internal pressure value (the target internal pressure value ($P_d-D_{pat}$) corrected by the corresponding atmospheric pressure) even when the preset time (the preset time based on the preset value $t_4$) has elapsed from the start of Mode D, the ECU 18 determines that the generated amount of the evaporated fuel is extremely small, and proceeds to Step S509.

When the process goes from Step S507 to Step S509, the ECU 18 sets the internal pressure value $P_{te}$ at the timing when the preset time (the preset time based on the value $t_4$) has elapsed as an internal pressure value $P_{end2}$, then proceeds to Step S510, where the pressure change amount $P_2$ (=$P_{end2}-P_{st2}$) within the preset time is calculated, and proceeds to Step S511.

When the process goes to Step S510 to Step S511, the ECU 18 checks whether or not the pressure change amount $P_2$ is smaller than the determination value $P_{th2}$ (more specifically, the determination value ($P_{th2}-D_{pat}$) corrected by the corresponding atmospheric pressure). In this case, the determination value $P_{th2}$ is a judgment value for determining "abnormality" based on the pressure change amount $P_2$ when the generated amount of the evaporated fuel is extremely small, and is set variably, for example, based on the level L of the remaining amount. More specifically, the determination value $P_{th2}$ is set to the small value based on a preset fuel remaining amount table when the level L of the remaining amount is low and the spatial capacity is large, and to a large value when the level L of the remaining amount is high and the spatial capacity is small. The determination value $P_{th2}$ may be set at the value in accordance with the level L of the remaining amount and the fuel temperature T based on the preset map of the fuel remaining amount and the fuel temperature T. In this case, the determination value $P_{th2}$ to be set increases with increase in the fuel temperature T.

Then, when it is determined to be $P_2 \leq P_{th2}-D_{pat}$ in Step S511, the ECU 18 determines that the leak sufficient to determine the "abnormal" does not exist in the evaporative emission control system (that is, the evaporative emission control system is "normal"), and hence proceeds to Step S512, where the NORMAL determination flag $F_{ok}$ is set to "1", resets the count value t to "0" in the subsequent Step S513, and leaves the subroutine.

On the other hand, when it is determined that $P_2 > P_{th2} - D_{pat}$ in Step S511, the ECU 18 proceeds to Step S514, and sets the CANCEL flag $F_{can}$, which indicates that the leak diagnosis is cancelled, to "1", and then resets the execution condition MET flag $F_{ex}$ to "0" in Step S515, and leaves the subroutine. In other words, if the pressure change amount $P_2$ is larger than $P_{th2} - D_{pat}$ ($P_2 > P_{th2} - D_{pat}$), it is not sufficient to determine that no sufficient leak occurs when the generated amount of the evaporated fuel is substantially zero; and hence the ECU 18 cancels the leak diagnosis of this time and leaves the subroutine.

When it is determined that the internal pressure value $P_{te}$ reaches the target internal pressure value ($P_{te} > P_d - D_{pat}$) in Step S506, the ECU 18 proceeds to Step S516. When the process goes from Step S506 to Step S516, the ECU 18 sets a Mode D END flag $F_d$, which indicates that Mode D is ended, to "1", and in subsequent Step S517, sets a pressure change measurement time $t_{e2}$ based on the obtained internal pressure rise time $t_{d2}$ ($=t-t_{d1}$). Then, in the subsequent Step S518, the ECU 18 resets the count t to "0", and leaves the subroutine. In this embodiment, the internal pressure rise time $t_{d2}$ is set as the pressure change measurement time $t_{e2}$.

When the process goes from Step S111 to Step S112 in the main routine, the ECU 18 checks whether or not the executing condition MET flag $F_{ex}$ is reset to "0" by the above mentioned Mode D process.

Then, when it is determined that the executing condition MET flag $F_{ex}$ is "0" in Step S112, the ECU 18 proceeds to Step S102, and then, executes the normal control of the valves, and then leaves the routine.

On the other hand, when it is determined that the executing condition MET flag $F_{ex}$ is "1" in Step S112, the ECU 18 proceeds to the Step S113, and checks whether or not the NORMAL determination flag $F_{ok}$ is set by the above mentioned Mode D process to "1".

Then, when it is determined that the NORMAL determination flag $F_{ok}$ is "1" in Step S113, the ECU 18 proceeds to Step S102 to execute the normal control of the valve, and leaves the routine. At this time, the ECU 18 sets the diagnosis execution flag $F_{diag}$ to "1".

On the other hand, when it is determined that the NORMAL determination flag $F_{ok}$ is not "1" in Step S113, the ECU 18 proceeds to Step S114. When the process goes to Step S113 to Step S114, the ECU 18 calls a Mode E execution subroutine shown in FIG. 8, and executes the Mode E process according to the subroutine (see a mode D in FIG. 9). This subroutine is for measuring the pressure change amount $P_1$ using the pressure change measurement time $t_{e2}$ set by the Mode D described above, and executes the leak diagnosis of the evaporative emission control system based on the pressure change amount $P_1$.

When the subroutine starts, the ECU 18 checks whether or not the count value t reaches the preset value $t_5$ in Step S601. In the Mode E, the count value t represents the time elapsed from the start of the Mode E. The preset value $t_5$ is a delay from the time Mode D described above has finished until measurement of the pressure change amount $P_1$ is started ($t_{e1}$ in FIG. 9), and for example, is variably set according to the level L of the remaining fuel amount. More specifically, the preset value $t_5$ is set on the basis of the preset table of the fuel remaining amount, and is set to a large value when the level L of the remaining amount is low and the spatial capacity is large. On the other hand, it is set to a small value when the level L of the remaining amount is high and the spatial capacity is small. Then, the ECU 18 ensures a realization of measurements of the pressure change amount $P_1$ of the value close to the atmospheric pressure by setting such a delay. The delay time described above (preset value $t_5$) may be set to the value according to the level L of the remaining amount and the fuel temperature T based on the preset map of the fuel remaining amount and the fuel temperature T. In this case, the preset value $t_5$ to be set decreases with the increase in the fuel temperature T. The preset value of the delay until the start of the measurement of the pressure change amount $P_1$ may be the set value of the level L of the remaining amount or the pressure change amount $P_3$ (see FIG. 9), which is variably set according to the level L of the remaining amount, or both of the level L of the remaining amount and the fuel temperature T, instead of the above-described preset value $t_5$ of the time.

Then, when it is determined that the count value t does not reach the preset value $t_5$ ($t \leq t_5$) in Step S601, the ECU 18 proceeds to the Step S602, where the count value t is incremented ($t \leftarrow t+1$), and then returns to Step S601.

On the other hand, when it is determined that the count value t reaches the preset value $t_5$ ($t > t_5$) in Step S601, the ECU 18 proceeds to Step S603 to set the current internal pressure value $P_{te}$ as the measurement-start internal pressure value $P_{st1}$ of the pressure change amount $P_1$, and proceeds to Step S604.

Since the pressure sensor 15 is for measuring the relative pressure with respect to the atmospheric pressure, in order to measure the amount of the change of the internal pressure value $P_{te}$ caused by the generation of the evaporated fuel or the like, it is necessary to correct a pressure value for variations in the atmospheric pressure. Therefore, when the process goes from Step S603 to Step S604, the ECU 18 sets the atmospheric pressure $P_{at}$ obtained when the measurement-start internal pressure value $P_{st1}$ was set as an initial value $P_{at0}$. Then, when the process goes from Step S604 to Step S605, the ECU 18 calculates the difference ($P_{at0} - P_{at}$) between the initial value $P_{at0}$ and the current atmospheric pressure $P_{at}$ as the atmospheric pressure correcting amount $D_{pat}$, and proceeds to Step S506.

When the procedure goes from Step S605 to Step S606, the ECU 18 checks whether or not the current count value t reaches the Mode E time ($t_{e1} + t_{e2}$) defined by the sum of the delay time $t_{e1}$ (that is, the preset value $t_5$) and the pressure change measurement time $t_{e2}$.

Then, when it is determined that the count value t does not reach the Mode E time ($t < t_{e1} + t_{e2}$) in Step S606, the ECU 18 proceeds to Step S607, where the count value t is incremented ($t \leftarrow t+1$), and returns to Step S605.

On the other hand, when it is determined that the count value t reaches the Mode E time ($t \geq t_{e1} + t_{e2}$) in Step S606, the ECU 18 proceeds to Step S608 to set the current internal pressure value $P_{te}$ as the measurement END internal pressure value $P_{end1}$ of the measurement of the pressure change amount $P_1$, and proceeds to Step S604.

Then, when the process goes from Step S608 to Step S609, the ECU 18 calculates the pressure change amount $P_1$ ($=P_{end1} - P_{st1}$) based on the measurement-start internal pressure value $P_{st1}$ and the measurement END internal pressure value $P_{end1}$, and then, proceeds to Step S610. In other words, the ECU 18 calculates the pressure change amount $P_1$ in the pressure change measurement time $t_{e2}$ of the evaporative emission control system.

When the process goes from Step S609 to Step S610, the ECU 18 checks whether or not the calculated pressure change amount $P_1$ is larger than the determination value corrected by the atmospheric pressure $P_{th0}$ (more specifically, the determination value ($P_{th0}-D_{pat}$)). Here, the determination value $P_{th0}$ is set on the basis of at least on the level L of the remaining amount (that is, the spatial capacity of the evaporative emission control system). More specifically, based on the preset map of the fuel remaining amount and the measuring time, the determination value $P_{th0}$ to be set to decrease with the increase of the spatial capacity of when the level L of the remaining amount is low, and decreases with the decrease in a measuring time. In other words, since the pressure change amount $P_1$ decreases with the increase of the spatial capacity and decrease in the measuring time, the determination value $P_{th0}$ is set to the small value. In this case, the ECU 18 can correct the determination value $P_{th0}$ using the time needed, which is set in Mode A described above, or the time needed, which is set in the Mode B described above. In other words, when the spatial capacity is a certain constant spatial capacity, it can be estimated that the amount of the evaporated fuel generation increases with the increase in the time needed, which is preset in Mode A or Mode B. Therefore, the ECU 18 corrects the determination value $P_{th0}$ to the larger value as the time needed increases.

When it is determined to be $P_1 \geq P_{th0}-D_{pat}$ in Step S610, ECU 18 determines that leak sufficient for determining "abnormal" does not exist in the evaporative emission control system (that is, the evaporative emission control system is "normal"), and proceeds to Step S611, where the NORMAL determination flag $F_{ok}$ is set to "1", and in subsequent Step S612, the count value t is reset to "0" and leaves the subroutine.

On the other hand, when it is determined to be $P_1<P_{th0}-D_{pat}$ in Step S610, the ECU 18 determines that the evaporative emission control system is "abnormal", and proceeds to Step S613.

In other words, when no leak occurs in the evaporative emission control system, the internal pressure value $P_{te}$ continuously rises by generation of the evaporated fuel even at the pressure close to the atmospheric pressure, and hence the pressure change amount $P_1$ becomes a relatively large value. On the other hand, when there is the leak in the evaporative emission control system, the leak converges the internal pressure value $P_{te}$ to the value close to the atmospheric pressure, and hence the pressure change amount $P_1$ becomes a relatively small value. Therefore, by setting the determination value $P_{th0}$ adequately as described above, it can be determined that the evaporative emission control system is "normal" when $P_1>P_{th0}-D_{pat}$, and is "abnormal" when $P_1<P_{th0}-D_{pat}$.

When the process goes from Step S610 to Step S613, the ECU 18 checks again whether or not the evaporative emission control system is "abnormal" by checking whether or not the following both determination conditions (5), (6) are met.

(5) The pressure change amount $P_{th1}$ is smaller than the determination value $P_{th1}$ (more specifically, the determination value ($P_{th1}-D_{pat}$) corrected by the atmospheric pressure).

Here, the determination value (a cancel determination value) $P_{th1}$ is a smaller value than the determination value $P_{th0}$, and is set on the basis of at least on the level L of the remaining amount. More specifically, based on the preset map of the fuel remaining amount and the measurement time, the determination value $P_{th1}$ is set to the smaller value when the level L of the remaining amount is low and the spatial capacity increases, and to the smaller value as the measurement time decreases. In other words, since the pressure change amount $P_1$ decreases with the increase in the spatial capacity and decrease in a measuring time, the determination value $P_{th0}$ is set to the small value. In this case, the ECU 18 can correct the determination value $P_{th0}$ by the use of the time needed, which is set in the Mode A described above, or the time needed, which is set in the Mode B described above. In other words, when the spatial capacity is a certain constant spatial capacity, it can be estimated that the generated amount of the evaporated fuel increases with the length of the time needed preset in Mode A or in Mode B. Therefore, the ECU 10 corrects the determination value $_{th0}$ to the large value as the respective time needed increases.

(6) The measurement END internal pressure value $P_{end1}$ is smaller than the predetermined pressure.

Here, the predetermined pressure with respect to the measurement END internal pressure value $P_{end1}$ is set, for example, based on the level L of the remaining amount. More specifically, the predetermined pressure is, based on the preset table of the fuel remaining amount, set to the closer value $t_0$ the atmospheric pressure as the level L of the remaining amount decreases and the spatial capacity increases.

Then, when it is determined that all the determination conditions of (5) and (6) are met (that is, $P_1<P_{th1}-D_{pat}$, $P_{end1}$<the predetermined pressure), the ECU 18 proceeds to Step S614, and determines that the leak sufficient to be determined as the "abnormal" occurs in the evaporative emission control system (that is, the evaporative emission control system is "abnormal"), sets the abnormality determining flag $F_{ng}$ to "1", and in the subsequent Step S615, the count value t is reset to "0" and leaves the subroutine.

On the other hand, when it is determined that either one of the determination conditions (5), (6) is not met in Step S613, since it is difficult to fix the determination of "abnormal" for the evaporative emission control system, the determination is cancelled, and the ECU 18 proceeds to Step S616 to set the cancel flag $F_{can}$ to "1" and, in subsequent Step S617, resets the execution condition MET flag $F_{ex}$ to "0", and leaves the subroutine. In other words, the case in which at least either one of the determination conditions (5), (6) is not met indicates such conditions that the pressure change amount $P_1$ is small, but it is difficult to precisely determine the cause whether it is because there is the leak or because the generated amount of the evaporated fuel is not sufficient. Therefore, in such a case, the ECU 18 cancels the determination of the "abnormality".

According to the embodiment as described above, by executing clocking of the internal pressure rise time $t_{d2}$ for setting the pressure change measurement time $t_{e2}$ or the pressure change amount $P_1$ using the pressure change measurement time $t_{e2}$ under the same evaporated fuel generating environment, the leak diagnosis with high degree of the accuracy is achieved.

In other words, by sealing the evaporative emission control system once at the negative pressure and executing various measurements without opening the evaporative emission control system to the atmosphere or introducing the negative pressure, information required for the diagnosis can be obtained without changing the generating state of the evaporated fuel, whereby the leak diagnosis with the high degree of the accuracy is achieved.

Figure 10:
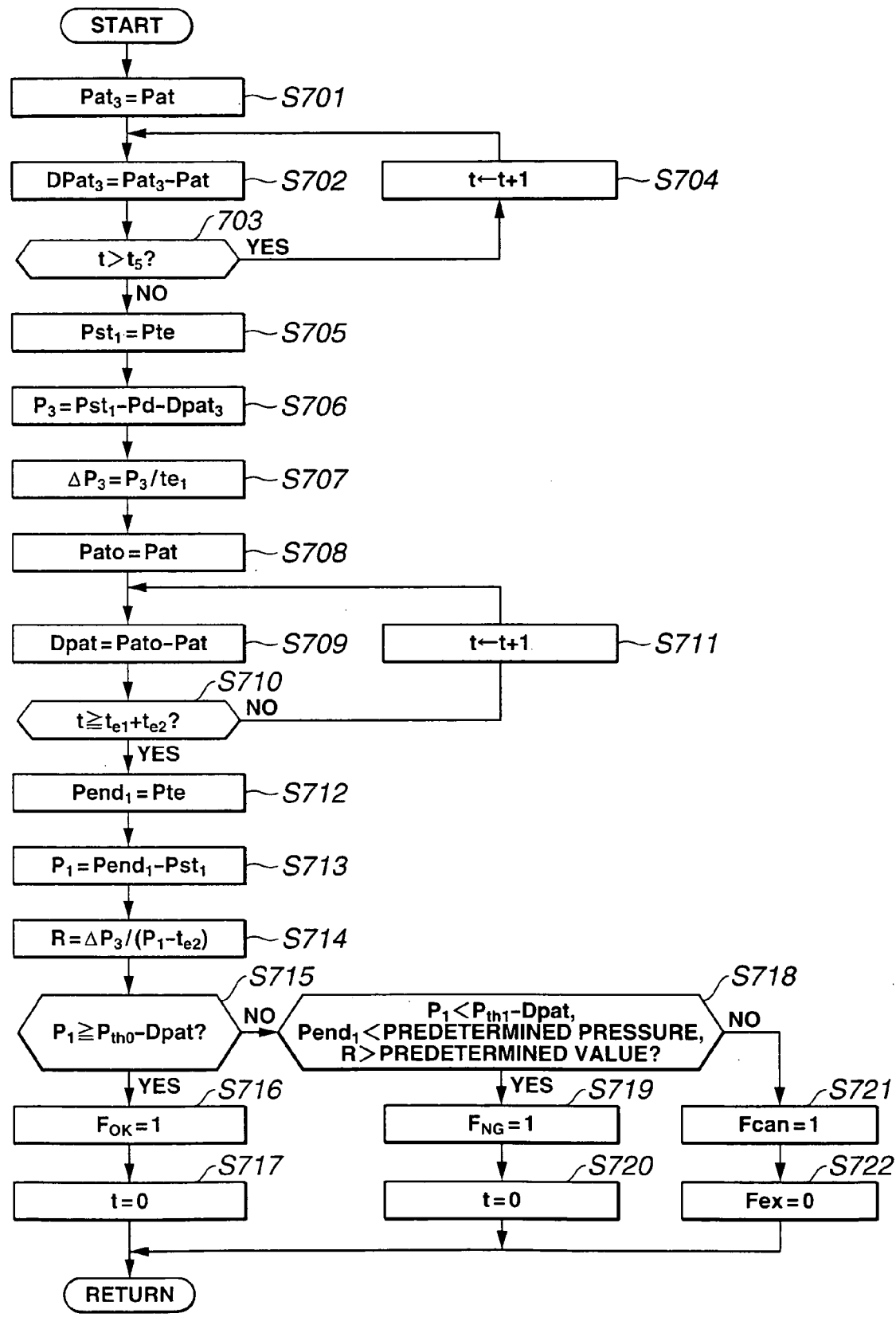
FIG. 10 is the flowchart of Mode E running subroutine according to a second embodiment of the present invention.

Subsequently, FIG. 10 is a second embodiment of the present invention, and is a flowchart of Mode E execution subroutine. This embodiment is different from the first embodiment described above in that the determination condition for determining the "abnormality" of the evaporative emission control system in the Mode E is added. Other points which are the same as the above-described first embodiment will not be described.

The Mode E execution subroutine is called by the ECU 18, and when the subroutine starts, the ECU 18 sets the atmospheric pressure $P_{at}$ immediately after the Mode E has started as an initial value $P_{st3}$ in Step S701. Then, when the procedure goes from Step S701 to Step S702, the ECU 18 calculates the difference $(P_{at3}-P_{at})$ between the initial value $P_{at3}$ and the atmospheric pressure $P_{at}$ as the atmospheric pressure correction amount $D_{pat3}$, and proceeds to Step S703.

When the process goes from the Step S702 to Step S703, the ECU 18 checks whether or not the count value $\underline{t}$ reaches the preset value $t_5$ or not. Then, when it is determined that the count value $\underline{t}$ does not reach the preset value $t_5$ ($t \leq t_5$) in Step S703, the ECU 18 goes to Step S704, where the count value $\underline{t}$ is incremented ($t \leftarrow t+1$), and returns to Step S702.

On the other hand, when it is determined that the count value $\underline{t}$ reached the preset value $t_5$ ($t > t_5$), the ECU 18 proceeds to Step S705, sets the current internal pressure value $P_{te}$ as the measurement start internal pressure value $P_{srl}$ of the pressure change amount $P_1$, and then proceeds to Step S706.

In subsequent Step S706, the ECU 18 calculates the pressure change amount $P_3$ during delay control described above based on the internal pressure value at the time Mode E (that is, the target internal pressure value $P_d$) started, the measurement start internal pressure value $P_{st1}$, and the atmospheric pressure correction amount $D_{pat3}$), and in the Step S707, the rate of the pressure change per unit time during the delay control $\Delta P_3$ ($=P_3/t_{e1}$) and proceeds to Step S708.

When the process goes from Step S707 to Step S708, the ECU 18 sets the atmospheric pressure $P_{at}$ obtained when the measurement start inner pressure value $P_{st1}$ was set as the initial value $P_{at0}$. Then, in Step S709, the ECU 18 calculates the difference between the initial value $P_{at0}$ and the current atmospheric pressure $P_{at}$ ($P_{at0}-P_{at}$) as the atmospheric pressure correction amount $D_{pat}$, and proceeds to Step S710.

When the process goes from Step S709 to Step S710, the ECU 18 checks whether or not the current count value $\underline{t}$ reaches the Mode E time ($t_{e1}+t_{e2}$) defined by the sum of the delay time $t_{e1}$ (that is, the preset value $t_5$) and the pressure change measuring time $t_{e2}$.

Then, when it is determined that the count value $\underline{t}$ does not reach the Mode E time ($t<t_{e1}+t_{e2}$), the ECU 18 proceeds to Step S711, where the count value $\underline{t}$ is incremented ($t \leftarrow t+1$), and returns to Step S709.

On the other hand, when the count value $\underline{t}$ reaches the Mode E time ($t \geq t_{e1}+t_{e2}$) in Step S710, the ECU 18 proceeds to Step S712, sets the current internal pressure value $P_{te}$ as the measurement END internal pressure value $P_{end1}$ of the measurement of the pressure change amount $P_1$, and proceeds to Step S713.

When the process goes from Step S712 to Step S713, the ECU 18 calculates the pressure change amount $P_1$ ($=P_{end1}-P_{st1}$) based on the calculation start internal pressure value $P_{atl}$ and the measurement END internal pressure value $P_{end1}$, and proceeds to Step S714. In other words, the ECU 18 calculates the pressure change amount $P_1$ within the pressure change measurement time $t_{e2}$ of the evaporative emission control system.

Then, the ECU 18 calculates the ratio (ratio of the rate of the pressure change) R between the rate of pressure change $\Delta P_3$ per unit time during the delay control and the rate of pressure change $\Delta P_1$ ($=P_1/t_{e2}$) per the unit time in the pressure change measuring time $t_{e2}$, and proceeds to Step S715.

When the process goes from Step S714 to Step S715, the ECU 18 checks whether or not the calculated pressure change amount $P_1$ is larger than the determination value $P_{th0}$ (more specifically, the determination value ($P_{th0}-D_{pat}$) corrected by the atmospheric pressure).

Then, when it is determined to be $P_1 \geq P_{th0}-D_{pat}$ in Step S715, the ECU 18 determines that the leak sufficient for determining as "abnormal" does not occur in the evaporative emission control system (that is, the evaporative emission control system is "normal"), proceeds to Step S716 where the NORMAL determination flag $F_{ok}$ is set to "1", resets the count value $\underline{t}$ to "0" in the subsequent Step S717, and leaves the subroutine.

On the other hand, when is determined that $P_1<P_{th0}-D_{pat}$ in Step S715, the ECU 18 determines that it is highly likely that the evaporative emission control system is "abnormal", and proceeds to Step S718.

When the process goes from Step S715 to Step S718, the ECU 18 checks whether or not all the following determination conditions (5), (6), and (7) are met, and verifies again whether or not the evaporative emission control system is "abnormal".

(5) The pressure change amount $P_1$ is smaller than the determination value $P_{th1}$ (more specifically, the determination value ($P_{th1}-D_{pat}$) corrected by the atmospheric pressure).

(6) The measurement END internal pressure value $P_{end1}$ is smaller than the predetermined pressure.

(7) The ratio of the rate of pressure change R is larger than the predetermined value.

Here, the predetermined value with respect to the ratio of the rate of the pressure change R is, for example, a predetermined constant value, and is set to the value larger than 1. The reason is that when there is no leak in the evaporative emission control system, a rise in the internal pressure value $P_{te}$ is maintained by the generation of the evaporated fuel, and the rates of pressure change $\Delta P_1$, $\Delta P_2$ are substantially the same (that is, the ratio of the rate of the pressure change R is equal substantially to 1), while when there is the leak in the evaporative emission control system, the rise in the internal pressure value $P_{te}$ due to the generation of the evaporated fuel is slugged in the vicinity of the atmospheric pressure, and hence the ratio of the rate of pressure change $\Delta P_1$ becomes smaller than $\Delta P_2$ (that is, the ratio of the rate of pressure change R becomes larger than 1).

Then, when it is determined that all the determination conditions (5), (6), and (7) are met (that is, $P_1<P_{th1}-D_{pat}$, $P_{end1}$<predetermined pressure, R>predetermined value) in Step S718, the ECU 18 proceeds to Step S719, and determines that the leak sufficient to be determined as "abnormal" occurs in the evaporative emission control system (that is, the evaporative emission control system is "abnormal"), sets the abnormality determination flag $F_{ng}$ to "1", resets the count value t to "0" in the subsequent Step S720, and leaves the subroutine.

On the other hand, when it is determined that at least either one of the determination conditions (5), (6), and (7) is not met in Step S718, since it is difficult to determine that the evaporative emission control system is "abnormal", the ECU 18 cancels the determination, proceeds to Step S721, where the cancel flag $F_{can}$ is set to "1", resets the execution condition MET flag $F_{ex}$ to "0" in subsequent Step S722, and leaves the subroutine. In other words, the case in which any one of the determination conditions (5), (6), and (7) is not met means the case in which although the pressure change amount $P_1$ is in a small state, it is difficult to determine whether it is because of the leak or because the amount of the generation of the evaporated fuel is small. Therefore, in such a case, the ECU 18 cancels the determination of "abnormality".

According to this embodiment, in addition to the effects which can be obtained by the first embodiment described above, the determination of "abnormality" with higher degree of the accuracy is achieved by adding the determination conditions. In this case, particularly, the diagnosis with a high degree of the accuracy is enabled in the evaporative emission control system to which the fuel that is low-volatile at the pressure close to the atmospheric pressure (that is, the amount of generation of the evaporated fuel at a pressure close to the atmospheric pressure is decreased) is applied.

Having described the preferred embodiments of the present invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A diagnostic apparatus for an evaporative emission control system including a fuel tank, comprising;
   negative pressure sealing control means for sealing an internal pressure of said evaporative emission control system at a preset negative pressure;
   measurement time setting means for setting a pressure change measurement time based on a time period which said internal pressure requires to reach a target internal pressure after said internal pressure is sealed at said preset negative pressure;
   pressure change amount measuring means for measuring a pressure change amount of said internal pressure in said evaporative emission control system within said pressure change measurement time after having reached said target internal pressure; and
   diagnostic means for determining whether said evaporative emission control system is normal or abnormal according to said pressure change amount.

2. The diagnostic apparatus for the evaporative emission control system according to claim 1, wherein:
   said measurement time setting means corrects said target internal pressure according to a variation in an atmospheric pressure.

3. The diagnostic apparatus for the evaporative emission control system according to claim 1, wherein:
   said diagnostic means determines whether said evaporative emission control system is normal or abnormal by comparing said pressure change amount and a determination value; and
   said diagnostic means corrects said determination value based on a variation in an atmospheric pressure.

4. The diagnostic apparatus according to claim 1, wherein:
   said diagnostic means determines whether said evaporative emission control system is normal or abnormal by comparing said pressure change amount and a determination value.

5. The diagnostic apparatus for the evaporative emission control system according to claim 4, wherein:
   said negative pressure sealing control means executes a stabilizing process for stabilizing said internal pressure at a value close to an atmospheric pressure and a negative pressure introducing process for introducing a negative pressure into said evaporative emission control system in said stabilizing process to cause said internal pressure to drop to said preset negative pressure so that said evaporative emission control system is sealed at said preset negative pressure, and
   said diagnostic means corrects said determination value based on at least one of required times for said stabilizing process performed by said negative pressure sealing control means and for said negative pressure introducing process.

6. The diagnostic apparatus for the evaporative emission control system according to claim 4, wherein:
   said diagnostic means discontinues determining whether said evaporative emission control system is normal or abnormal when said required time for said stabilizing process executed by said negative pressure sealing control means exceeds a predetermined time.

7. The diagnostic apparatus for the evaporative emission control system according to claim 5, wherein:
   said diagnostic means discontinues determining whether said evaporative emission control system is normal or abnormal when said required time for said pressure introducing process executed by said pressure sealing control means exceeds a predetermined time.

8. The diagnostic apparatus according to claim 4, wherein:
   said determination value is set based on a remaining fuel amount.

9. The diagnostic apparatus according to claim 4, wherein:
   said determination value is set based on a spatial capacity in said evaporative emission control system.

10. The diagnostic apparatus according to claim 4, wherein:
    said diagnostic means determines said evaporative emission control system is normal when said pressure change amount is larger than said determination value.

11. The diagnostic apparatus according to claim 4, wherein:
    said diagnostic means determines said evaporative emission control system is abnormal when said pressure change amount is smaller than said determination value.

12. The diagnostic apparatus for the evaporative emission control system according to claim 1, wherein:
    said diagnostic means determines said evaporative emission control system to be normal when said internal pressure after having sealed at said preset negative pressure is below a predetermined pressure value after a preset time has elapsed.

13. The diagnostic apparatus for the evaporative emission control system according to claim 1, wherein:
    said diagnostic means determines whether said evaporative emission control system is normal or abnormal by comparing said pressure change amount and a determination value; and
    said diagnostic means sets a cancel determination value based at least on a spatial capacity of said evaporative emission control system and cancels determination that said evaporative emission control system is abnormal based on said determination value when said pressure change amount is larger than said cancel determination value.

14. The diagnostic apparatus for the evaporative emission control system according to claim 1, wherein:

said diagnostic means determines whether said evaporative emission control system is normal or abnormal by comparing said pressure change amount and a determination value; and said diagnosis means cancels determination that said evaporative emission control system is abnormal based on said determination value when said internal pressure after measuring said pressure change amount is higher than a predetermined pressure.

15. The diagnostic apparatus for the evaporative emission control system according to claim 1, further comprising:

delay control means for controlling a delay from a time when said internal pressure reaches said target internal pressure until a start of measuring said pressure change amount by said pressure change amount measuring means.

16. The diagnostic apparatus for the evaporative emission control system according to claim 15, wherein:

said diagnostic means cancels determining said evaporative emission control system is abnormal based on a determination value when a ratio between a rate of pressure change during controlling said delay and a rate of said pressure change during measuring said pressure change amount does not exceed a predetermined value.

* * * * *